May 29, 1934.   J. D. MacLACHLAN   1,960,542
UNIVERSAL ELECTRIC MOTOR
Filed Nov. 2, 1931   2 Sheets-Sheet 1

Inventor
John D. MacLachlan
By Thorpe & Thorpe
Attorneys

May 29, 1934.    J. D. MacLACHLAN    1,960,542
UNIVERSAL ELECTRIC MOTOR
Filed Nov. 2, 1931    2 Sheets-Sheet 2
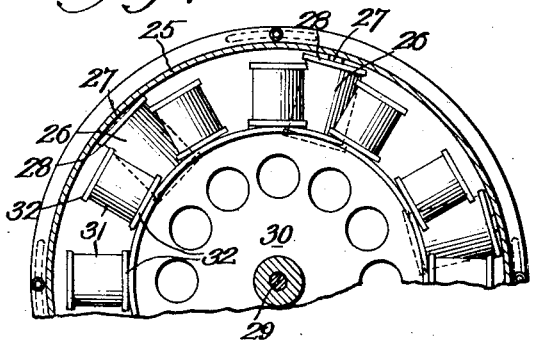
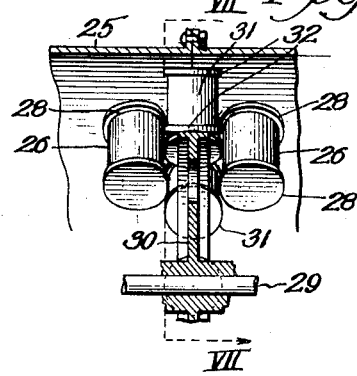
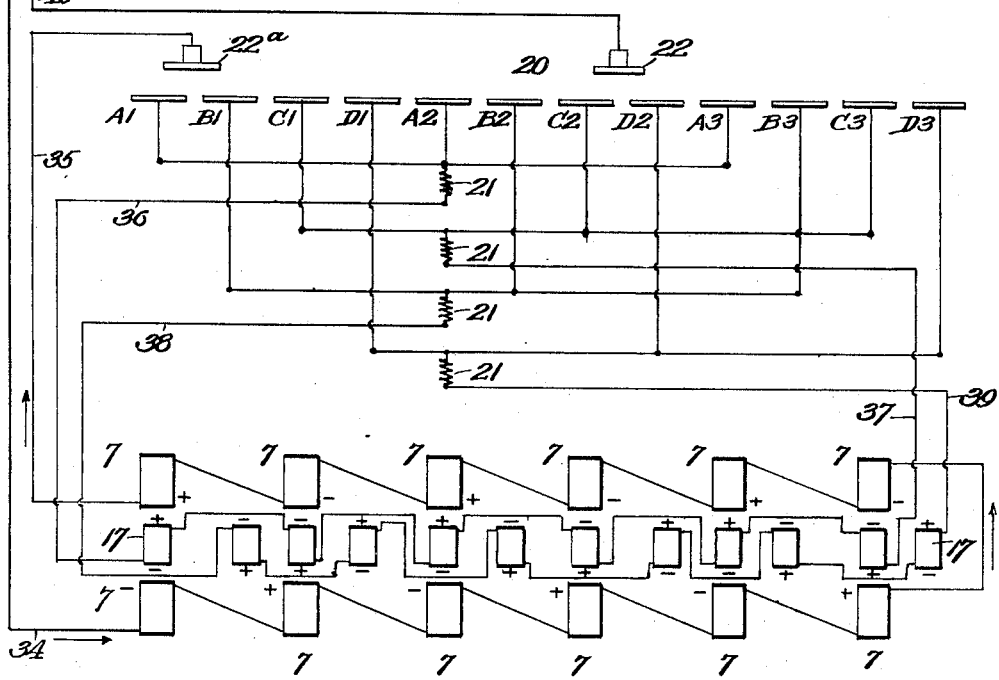
Inventor
John D. MacLachlan.
By Thorpe & Thorpe
Attorneys Patented May 29, 1934

1,960,542

UNITED STATES PATENT OFFICE 1,960,542

UNIVERSAL ELECTRIC MOTOR

John D. MacLachlan, Kansas City, Mo., assignor to Mac Ad Company, Kansas City, Mo., a corporation of Missouri Application November 2, 1931, Serial No. 572,563

3 Claims. (Cl. 172—276)

This invention relates to dynamo-electric machines and has for its general object to produce a machine of the character set forth in which the electro-magnetic coils of both the stator and rotor, may be readily and easily changed to vary the operative characteristics of the machine to suit any predetermined conditions of installation.

A further object of the invention is to produce a machine in which the rotor and stator are so related that the former is not circumscribed by the latter and it is, therefore, possible to produce a machine within a predetermined diameter which has a larger rotor and more torque than a machine of standard construction.

Another object is to produce a construction in which the magnetic field between the rotor and stator is arranged in a circular plane parallel to the axis of the rotor, as distinguished from standard construction in which the axes of the magnetic field are arranged in planes radial to the shaft or axis of the rotor.

A further object of the invention is to produce a dynamo-electric machine having a rotor field so arranged that the electro-magnetic field developed at both ends of the rotor windings, shall have a companion stator field.

A still further object of the invention is to provide a dynamo-electric machine with distributing members or rings, to which the rotor coils may be connected to simplify the wiring of the machine and in which, when desired, the distributing members may take the form of resistances in series with the rotor to lower the speed of rotation and to prevent arcing at the brushes.

Another object of the invention is to produce a machine of such design that it will develop greater power for the same input energy than standard motors, this result being accomplished by so designing the rotor that when one-half of the coils are on center they are using no current with the result that the other set of rotor coils are increased in magnetic flux; and in which there is no hub subject to magnetic hysteresis or eddy currents. The design is also of such nature that the rotor coils are provided with continuous magnetic pole pieces to reduce the formation of eddy currents in the field pole pieces and in which the independent coils reduce self-induction to a minimum.

A further advantage of a motor of the design under consideration lies in the fact that the magnetic flux is continuously built up on any predetermined coil from a minimum to a maximum within a space of about thirty degrees, when it falls back and then commences to build up again, this effect resulting in a constantly shifting field so that the rotor enters the magnetic field gradually and with the rotor and field coils parallel, there is no possible chance for the magnetic field to become distorted, as there are no places for cross-magnetization.

One of the chief reasons why a motor of the design under consideration will not revolve beyond a predetermined safe and slow speed, lies in the fact that the construction is such that the core material of each rotor coil has a positive governing action on the speed of rotation as the polarity of each coil must change in one revolution as many times as there are field coils,—in the design shown, seventy two times. Thus it will be evident that by a slight change in the nature of the cores of the rotor coils a high torque and low speed may be readily secured.

With the general objects named in view, the invention consists in certain novel and useful features of construction and organization of parts as hereinafter described and claimed; and in order that it may be fully understood reference is to be had to the accompanying drawings, in which:—

Figure 7 is a fragmentary vertical cross-section of a modified construction in which the coils are disposed radially of the axis of the rotor, on line VII—VII of Figure 8.

Figure 8 is a fragmentary vertical section taken at right angles to Figure 7 to more clearly disclose the radial relative positions of the coils around the axis of the motor.

Figure 9 is a diagrammatic view of the wiring connections.

Figure 1:
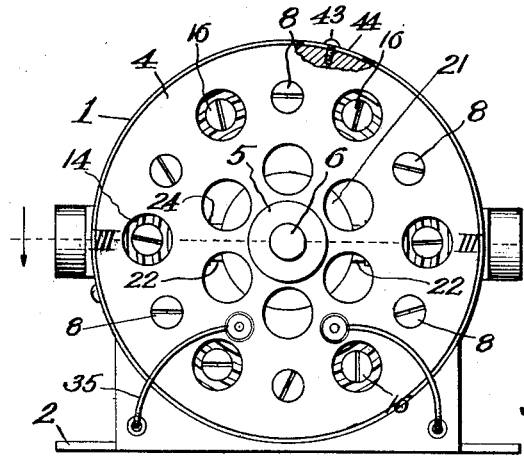
Figure 1 is an end view of an electric motor embodying the invention.
Figure 2:
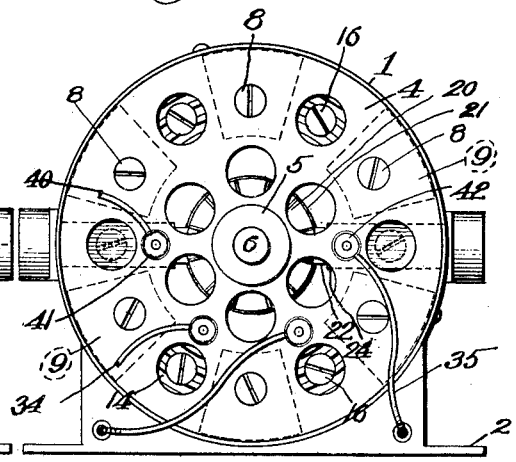
Figure 2 is a view of the opposite end of the motor.
Figures 3, 4, 5, 6:
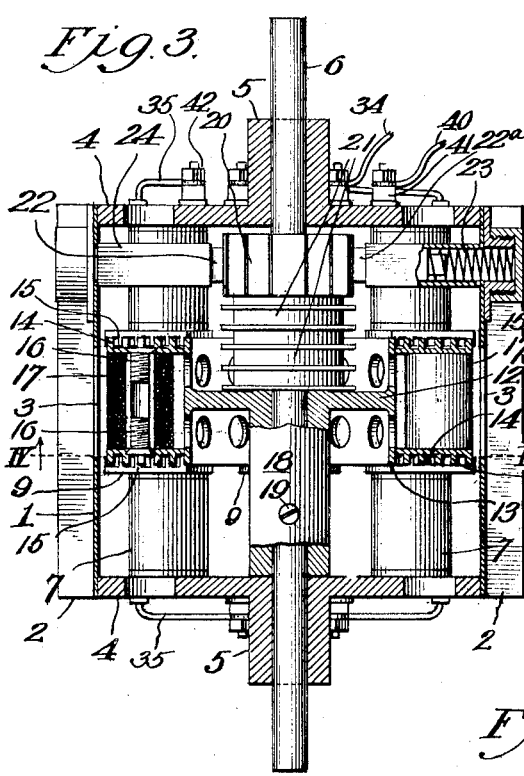
Figure 3 is a horizontal section on the line III—III of Figure 1.
Figure 4 is a vertical section on the line IV—IV of Figure 3.
Figure 5 is an enlarged view to show the corrugated construction of the pole pieces of the coils of the stator.
Figure 6 is a broken side view showing one of the stator coils with its pole piece in central vertical section.

In the said drawings, where like reference characters identify corresponding parts in all of the figures, but referring to Figures 1 to 6 in particular, 1 indicates a suitable casing or housing which as illustrated comprises a cylindrical member open at its opposite ends and provided with any suitable base or securing feet 2. Intermediate the length of the casing it is formed with air ports or openings 3 for the exit of cooling air as will hereinafter appear.

The ends of the housing 1 are closed by end plates 4 of magnetic material by preference, and said plates are provided with center bearings 5 for the reception of an armature or rotor shaft 6. Each of the end plates 4 supports a set of field coils 7 arranged on the plates concentrically of the axis of the armature shaft 6, the axis of said coils being parallel to the axis of the shaft. The coils 7 are held to the plate 4 by means of machine bolts 8, and each of said coils at its opposite end is provided with a pole piece 9 held in position by a machine screw 10, said pole pieces of different coils being spaced apart to provide air gaps and being arranged in horizontal alinement and having their faces corrugated to form a series of ribs and grooves 11 on their faces struck from a radius having as its center the axis of the rotor shaft, for a purpose which will hereinafter appear.

Carried by the armature shaft 6 is a rotor comprising a skeleton wheel 12 having a relatively wide peripheral rim 13, and rigidly mounted on and at the side edges of said rim are circular corrugated pole pieces 14 to provide circular ribs and grooves 15 intermeshing with the corresponding faces of the stator pole pieces. Secured to and between the pole pieces 14 by bolts 16 are electro-magnetic rotor coils 17 having their axes parallel with the axis of the rotor shaft and in alinement with the axes of the field magnets. It will be noted in this connection that the rotor hub 18 is adjustably locked to the shaft by a securing screw 19 so that, instead of advancing or retarding the magnetic lag by moving the brushes or field coils, the armature itself may be adjusted to accomplish the same result.

A consideration of the mounting of the stator and rotor coils will indicate that any of them may be readily removed, either as a unit, or as a whole, for replacement with other coils for varying the characteristics of the motor. It is moreover apparent that with a motor of the design disclosed, the rotor may always be of the same diameter as the stator, and thus make it possible to have a greater torque within the same diameter than with any standard motor with which I am familiar.

A series motor is illustrated in the drawings, with twelve field coils 7 arranged in two sets of six each on opposite sides of the rotor, the armature or rotor being provided with twelve coils 17 arranged in two sets of six each, every other coil being electrically connected as indicated in Figure 9. Mounted on the armature shaft is a commutator 20 having twelve segments, and as a convenient means of connecting the rotor coils to the segments to avoid a multiplicity of complicated wiring, the shaft of the rotor is provided with four insulated resistance windings 21 to avoid arcing at the brushes, although of course four metal rings may be substituted for the windings 21, if arcing is not pronounced. The segments and the coils in groups are connected to the proper windings 21 according to the desired characteristics of the machine, any suitable brushes for the commutator being provided, such as the carbon brushes 22 advanced by spring 23 carried by housing 24 secured in the casing 1.

In Figures 7 and 8, a modified double stator arrangement is illustrated in which 25 is a non-magnetic housing or casing, within the opposite ends of which are radially arranged sets of stator coils 26, each coil being held in position by means of a securing bolt 27 passing through the housing. At the opposite ends of each coil it is provided with a magnetic pole or field piece 28. The ends (not shown) of the casing 25 may be utilized to support bearings (not shown) in which a rotor shaft 29 is journaled, said shaft intermediate its ends carrying a rotor wheel 30 to which are radially secured a plurality of rotor coils 31, each coil having heavy field or pole pieces 32 at its opposite ends and being mounted on the wheel 30. It will be noted that the pole pieces of the rotor and stator coils overlap each other as shown most clearly in Figures 7 and 8, this construction being similar in effect to the grooved and ribbed surfaces of the pole pieces of the construction first above described and for the same purpose as will hereinafter more particularly appear. It will be apparent from a consideration of the drawings, that with the casing split in its center as illustrated in Figure 8, it is readily possible to remove one side of the stator so that the armature may be pulled, when either coils or the armature or stator may be readily substituted by others to change the operating characteristics of the motor without the necessity of rewinding the same, and that in the construction shown in Figures 7 and 8, it is possible to withdraw the armature by removal of the right hand end plate.

In both types of construction, in order that the rotor may aline itself with the field and not be drawn toward one side or the other, a special construction must be adopted to insure that the rotor will assume and maintain this centralized position. It is well known in the art, that the magnetic field is stronger at an edge, corner or point, and by having the overlapping pole pieces of Figures 7 and 8, this effect of a magnetic field is employed to hold the rotor centered, as when the current is turned into the motor, the flux between the overlapping edges of the pole pieces of the rotor and stator, will immediately tend to balance itself with a consequent centering of the rotor, and thus obviate the use of thrust bearings, other than as a precautionary or safety measure. It will be noted that the slots are of greater depth than the mesh so that it shall be impossible for the flat surfaces of the corrugations to come so close together that the magnetic effect of the flat surfaces counterbalances the tendency of the corners of edges to keep the rotor centered.

*Operation*

Referring to the diagrammatic figure, it will be noted that the rotor and stator are connected in series, as follows: Line wire 34 is connected to one of the stator coils 7 (26) and all of the coils of the stator are then connected in series with the first coil, the terminal stator coil 7 being connected by a wire 35 to the first (or left hand) brush 22a, of Figure 9. The commutator 20 is divided into twelve segments, and the segments are arranged in four groups of three each, namely segments A1, A2, A3; B1, B2, B3; C1, C2, C3; and D1, D2, D3, the segments of the groups A, B, C and D being respectively connected to the upper ends of the resistance coils or distributors 21. The coils 17 of the rotor are arranged in two groups of six each, each group comprising every other coil, and as illustrated the first coil 17 of the first group is connected by a wire 36 to the bottom of the second resistance coil 21, and the last coil of said group is connected by a wire 37 to the second resistance coil 21. The first coil (or left hand coil) 17 of the second rotor group is connected by a wire 38 to the bottom of the third resistance coil 21, and the last coil of said group is connected by a wire 39 to the bottom of the fourth resistance coil 21, it being noted that in the position shown in the diagrammatic figure, segments A1 and B1 are in contact with brush 22a and that the other brush 22 is in contact with segments C2 and D2, so that the coils of the two groups are respectively energized, as shown by the plus and minus signs, the second brush 22 being connected to the other lead or line wire 40. Consideration of the diagram will show that assuming the current as flowing in the direction of the arrows, segments A1, A2 and A3 and segments B1, B2 and B3, will, when in contact with the first brush 22a feed the current in one direction through their respective groups of rotor coil, but that when the rotor has moved to place segments C1, C2 or C3 or segments D1, D2 or D3, in contact with said brush, the direction of the current flowing through the rotor coils is reversed. Thus in each revolution of the rotor, the current in each rotor coil is reversed seventy-two times, which is a condition resulting in the production of a high torque at low speed, the principle desideratum of the invention.

For the purpose of cooling the coils, the casing is provided about midway its length with a series of ports or openings 3, the revolution of the rotor providing a flow or current of air through the end plates and out through the casing ports to prevent overheating of the parts.

Assuming that the rotor is in a neutral position relative to the stators, that is with every other coil of the rotor (Figure 1 to 4) axially alined with opposite stator coils, the closing of the switch (not shown) will energize the stator coils and the coils of the rotor which are out of alinement with or offset relative to the stator coils, the current then flowing from line wire 34 through the stator coils, brush 22a, the particular commutator segment engaged by the said brush, the connected distributor 21, then through the said offset series of rotor coils, then through conductor 37 and the distributor electrically connected thereto and to the connected commutator segment engaged by the other brush 22, and thence the line wire 40. The energization of the stator coils and the off-set coils of the rotor develop a magnetic pull responded to by the rotor and overcomes the relatively light resistance to movement offered by the non-energized coils of the rotor and the axially alined stator coils.

By disconnecting the wire 40 from brush binding post 41 and connecting it with brush binding post 42, and changing wire 35 from post 42 to binding post 41, the direction of flow of the current is reversed through the rotor to effect reverse rotation thereof.

Assuming that the motor is at rest with every other coil of the rotor in axial alinement with opposite stator coils, it will be apparent that said rotor coils, being non-energized at such time, will have a tendency to resist rotation because of the field coil attraction of the dead coils, it being understood that as the rotor coils become axially alined with opposite stator coils, the commutator coils connected to such rotor coils are not in engagement with the brushes.

To increase the starting torque it is desirable to off-set the two sets of field coils so that it shall never be possible for one set of rotor coils to be in axial alinement simultaneously with two coils of opposite stators. For motors for fans and the like where rotation is in one direction only, the off-setting of the two sets of field coils may be permanent, but for reversible motors, it is desirable to be able to rotatably shift one set of stator coils relative to the other, the shifting being in the direction the motor is to run. To accomplish this result in a simple and efficient manner in the embodiment shown by Figures 1 to 4 inclusive, there are a plurality of screw bolts 43 extending through slots 44 into the respective end plate, so that by slightly unscrewing the bolts the said end plate can be turned the desired distance in the desired direction and be resecured in such position by proper manipulation of the bolts until their heads clamp firmly upon the casing. To obtain the same result in the construction shown by Figures 7 and 8, the half of the casing carrying the field (stator) coils to be shifted, is turned and then refastened to the other half of the casing.

From the above description, it will be evident that I have produced a motor embodying the features of advantage pointed out as desirable; and while I have described the preferred embodiment of the invention, I reserve the right to make all changes falling within the spirit of the invention and without the ambit of the prior art.

I claim:—

1. A dynamo-electric machine comprising a casing having radial air ports substantially midway its length, stators arranged within the casing and adjacent its opposite ends, and a rotor within the casing and between the stators and provided with a circular perforated rim to accommodate the circulation of air through the stators and the casing ports.

2. A dynamo-electric machine comprising a rotor provided with a series of coils arranged with their axes parallel to the axis of the rotor, and a pair of stators, one on each side of the rotor and each having field coils with their axes in alinement with the axes of the rotor coils, said rotor and stator coils being provided with corrugated pole pieces, the corrugations mutually projecting one within the other.

3. A dynamo-electric machine comprising a rotor having a series of coils arranged with their axes parallel to the axis of the rotor, and a pair of stators, one on each side of the rotor and each having field coils with their axes in the same plane as the axes of the rotor coils, said rotor coils at their opposite ends being provided with concentrically corrugated pole pieces, and the stator coils of each series having an integral annular pole piece having a corrugated face, the ribs and grooves of the rotor and stator pole pieces mutually fitting one within the other but spaced slightly apart.

JOHN D. MacLACHLAN.